United States Patent [19]

Carroll

[11] Patent Number: 5,645,000

[45] Date of Patent: Jul. 8, 1997

[54] SEED FURROW CLOSING APPARATUS FOR AGRICULTURAL PLANTERS

[76] Inventor: Walter R. Carroll, HCR 65, Box 77, Wauneta, Nebr. 69045

[21] Appl. No.: 659,549

[22] Filed: Jun. 6, 1996

Related U.S. Application Data

[60] Continuation-in-part of Ser. No. 517,252, Aug. 21, 1995, which is a division of Ser. No. 33,272, Mar. 15, 1993, Pat. No. 5,443,023.

[51] Int. Cl.⁶ ............................................. A01B 17/00
[52] U.S. Cl. ........................ 111/195; 111/191; 172/540; 172/551
[58] Field of Search ........................... 111/139, 140, 111/191, 192, 193, 194, 195; 172/40, 42, 177, 196, 540, 551

[56] References Cited

U.S. PATENT DOCUMENTS

| | | | |
|---|---|---|---|
| 1,901,299 | 3/1933 | Johnson | 111/195 X |
| 2,258,626 | 10/1941 | Satrom | 111/192 X |
| 2,825,983 | 3/1958 | Finn | 172/540 X |
| 3,392,791 | 7/1968 | Orthman | 172/551 X |
| 3,742,877 | 7/1973 | Coffee | 111/191 X |
| 4,640,366 | 2/1987 | Saito | 172/42 |
| 4,920,901 | 5/1990 | Pounds | 111/194 X |
| 5,299,647 | 4/1994 | Mudd et al. | 172/540 X |
| 5,316,088 | 5/1994 | Ries | 172/551 X |

*Primary Examiner*—Terry Lee Melius
*Assistant Examiner*—Robert Pezzuto
*Attorney, Agent, or Firm*—Henderson & Sturm

[57] ABSTRACT

A seed furrow closing apparatus which utilizes a pair of tine wheels having inner and outer press plates which may be selectively removed depending on the particular soil conditions and amount of debris and residue encountered. The tine wheel comprises a hub for operative engagement upon each press wheel axle and has a plurality of circumferentially spaced, radially curved tines projecting therefrom. The individual press plates have a central aperture for the hub and a circumferential shoulder with a plurality of slots through which extend the tines. The press plates may be bolted together to form a press wheel with tines extending from the outer rim, or one or both plates may be removed as would be desirable in heavy gumbo soils or when encountering excessive debris. The press plates further include a slot running from the hub aperture to the shoulder to allow removal of the plate without removing the tine wheel from the axle.

3 Claims, 5 Drawing Sheets

1

SEED FURROW CLOSING APPARATUS FOR AGRICULTURAL PLANTERS

RELATED APPLICATION

This is a continuation-in-part of application Ser. No. 08/517,252 filed Aug. 21, 1995, which in turn is a division of application Ser. No. 08/033,272 filed Mar. 15, 1993, now U.S. Pat. No. 5,443,023.

TECHNICAL FIELD

This invention relates to an improved apparatus for effecting the closing of an open seed furrow produced in soil by a tractor drawn planter which sequentially deposits seed into the open furrow as it is produced during the forward movement of the planter, and particularly to an apparatus capable of reliable closing of seed furrows produced in soils of varying compositions and which have received varying levels of tillage subsequent to the harvesting of the previous crop.

BACKGROUND ART

Modern agricultural planters typically utilize a pair of discs which rotate together and cut into the soil as they are drawn across the ground to form a furrow. Seed is then deposited into the furrow at regular, spaced intervals and then the furrow is closed over the seed for germination to begin. As depicted in FIGS. 1A and 1B, the standard practice of closing the furrow F over the seeds S is to utilize a pair of press wheels W. These press wheels are drawn behind the seed depositing mechanism and straddle the furrow, with one wheel on each side of the furrow and normally angled inwardly at the bottom where the wheel contacts the ground immediately adjacent the furrow. As the press wheels are drawn along the furrow, they press the sides of the furrow together, closing it over the deposited seed. These standard press wheels are often less than satisfactory in some soil conditions. For example, in soil with a high clay content the furrow walls can be so tightly compacted together as to form an impenetrable barrier over the germinating seed.

In recent years, a new approach called no-till farming has been introduced wherein the fields are planted without first tilling the previous crop. The presence of the stubble and residue from the previous crop substantially reduces the loss of water from the soil and also greatly reduces erosion. However, this residue can have an adverse affect on the planting by interfering with the action of the furrow forming discs and the furrow closing press wheels. Devices are being developed which are attached to the planter ahead of the furrow cutting discs and function to chop up and clear the residue and debris to facilitate the action of the furrow forming discs and the furrow closing devices.

While these row cleaning devices are quite effective, the residue and debris still interfere somewhat with the press wheels. U.S. Pat. No. 5,443,023 to this inventor discloses a furrow closing device which utilizes a pair of tine wheels in place of the standard press wheels. As depicted in FIGS. 2A and 2B, as these tine wheels are drawn adjacent the seed furrows, the tines are able to penetrate the residue and debris to better enable furrow closure. Furthermore, the side walls of the furrows and the adjacent soil are fragmented as the furrow is closed, preventing excessive soil compaction. However, even this improvement was less than satisfactory in loose or sandy soil. In those situations, the soil was overly fragmented and therefore suffered an excessive loss of moisture.

DISCLOSURE OF THE INVENTION

The present invention discloses a seed furrow closing apparatus which utilizes a pair of tine wheels having inner and outer press plates which may be selectively removed depending on the particular soil conditions and amount of debris and residue encountered. The tine wheel comprises a hub for operative engagement upon each press wheel axle and has a plurality of circumferentially spaced, radially curved tines projecting therefrom. The individual press plates have a central aperture for the hub and a circumferential shoulder with a plurality of slots through which extend the tines. The press plates may be bolted together over the tine wheel to form a press wheel with tines extending from the outer rim, or one or both plates may be removed as may be desirable in heavy soils or when encountering excessive debris. The press plates further include a slot running from the hub aperture to the shoulder to allow removal of the plate without first removing the tine wheel from the axle.

This improved furrow closing apparatus allows farmers to make changes in the field when weather conditions change the soil texture. Further, the apparatus is adaptable to soils that range from heavy, sticky gumbo to deep sandy soils, and soils with very heavy residue to soils growing with heavy sod that normally resist closing with the prior art solid round wheels. Testing has revealed that the depressions left in the soil from the tine penetration of the sidewalls and the washboard surface allow more absorption of sunlight and increased soil temperature. These depressions also tend to create hairline cracks in soils low in organic residue, preventing crusting after heavy rains which often prevent seeds from sprouting after germination.

BRIEF DESCRIPTION OF THE DRAWINGS

These and other attributes of the invention will become more clear upon a thorough study of the following description of the best mode for carrying out the invention, particularly when reviewed in conjunction with the drawings, wherein.

BEST MODE FOR CARRYING OUT THE INVENTION

Figure 1A:
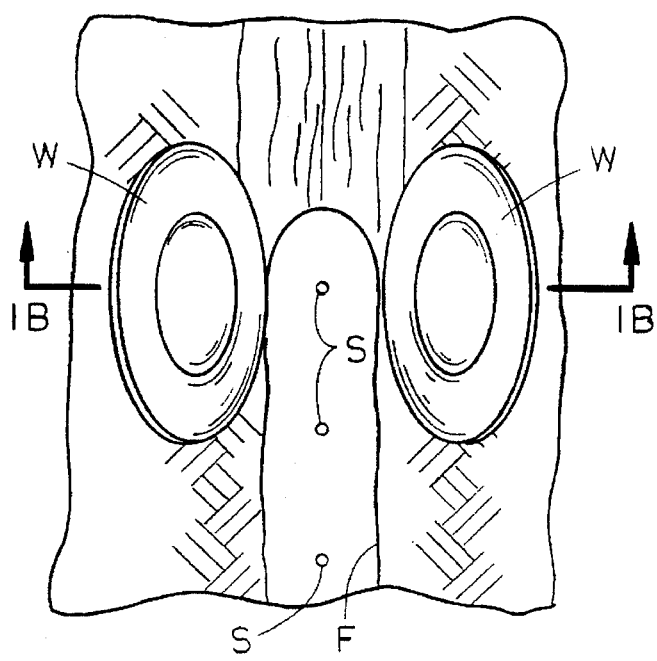
FIG. 1A is a schematic top view of a prior art seed furrow closing apparatus.
Figure 1B:
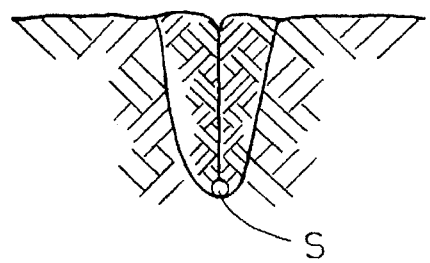
FIG. 1B is a sectional view taken on the plane 1B—1B of FIG. 1A.

Referring now to the drawings, wherein like reference numerals designate identical or corresponding parts throughout the several views, FIGS. 1A illustrates a pair of press wheels W of the prior art which are mounted behind a planter (not shown) for rotation about two axes that lie in a common vertical plane, but are inclined relative to each other so as to position the lower edges of the press wheels W adjacent the sidewalls of an open seed furrow F in which seeds S have been deposited at spaced intervals. As the press wheels W are drawn along the sidewalls, the sidewalls are pressed together thereby covering the seed S as seen in FIG. 1B.

Figure 2A:
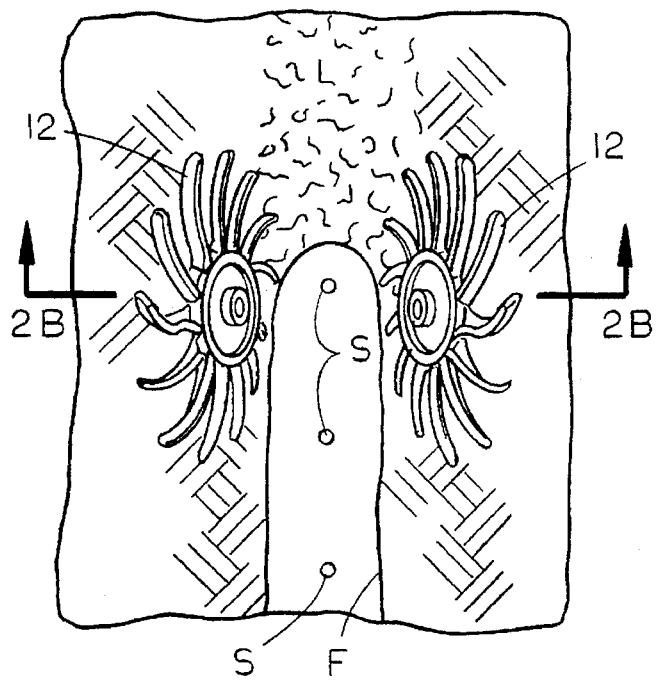
FIG. 2A is a schematic top view of a first configuration of the seed furrow closing apparatus of the present invention.
Figure 2B:
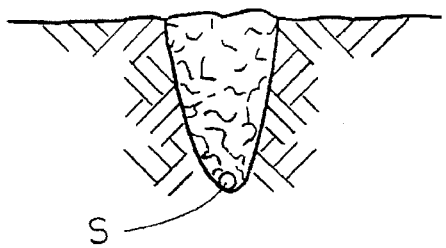
FIG. 2B is a sectional view taken on the plane 2B—2B of FIG. 2A.

Referring now to FIGS. 2A and 2B, the same furrow F is shown with seeds S deposited at spaced intervals. However, the wheels W have been replaced with a first configuration of the present invention which utilizes a pair of tine wheels 12 in place of the furrow closing wheels W.

Figure 3A:
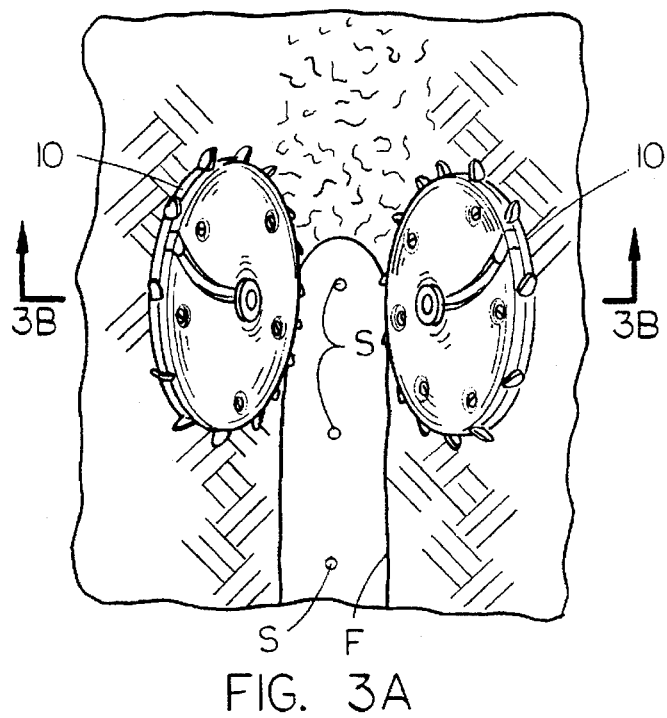
FIG. 3A is a schematic top view of a second configuration of the seed furrow closing apparatus of the present invention.
Figure 3B:
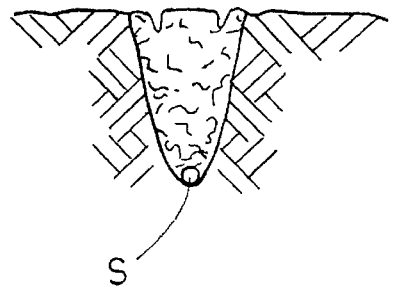
FIG. 3B is a sectional view taken on the plane 3B—3B of FIG. 3A.

Referring to FIGS. 3A and 3B, a second configuration of the present invention is depicted at 10 in which the tine wheels 12 of the first configuration are partially sandwiched between a pair of press plates as will be fully described below.

Figure 4:
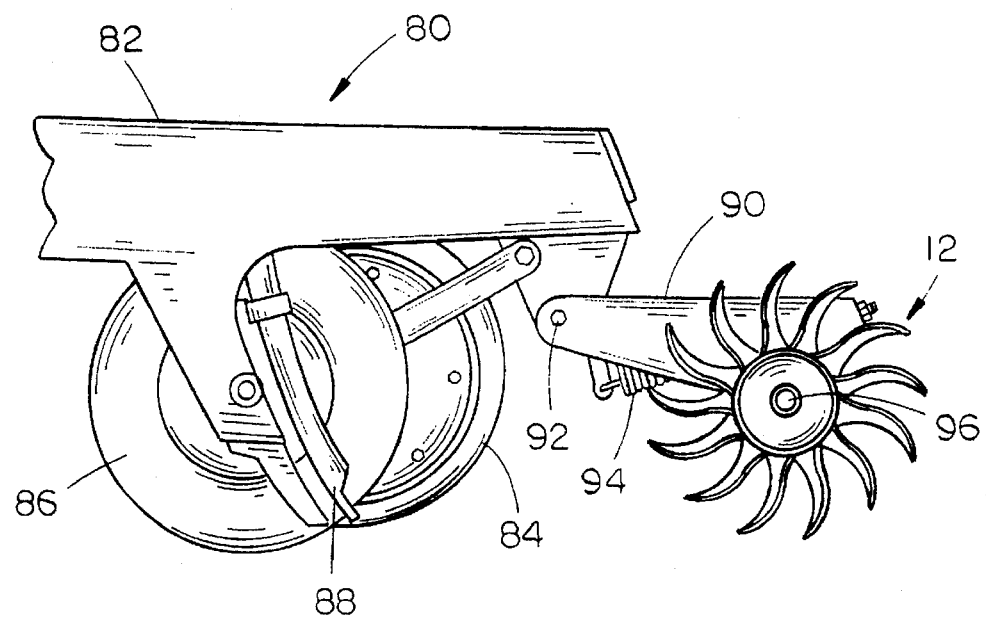
FIG. 4 is a side elevational view of a seed planter incorporating the first configuration of the seed furrow closing apparatus of the present invention, with the left gauge wheel and left furrow forming disc removed for clarity of illustration.
Figure 5:
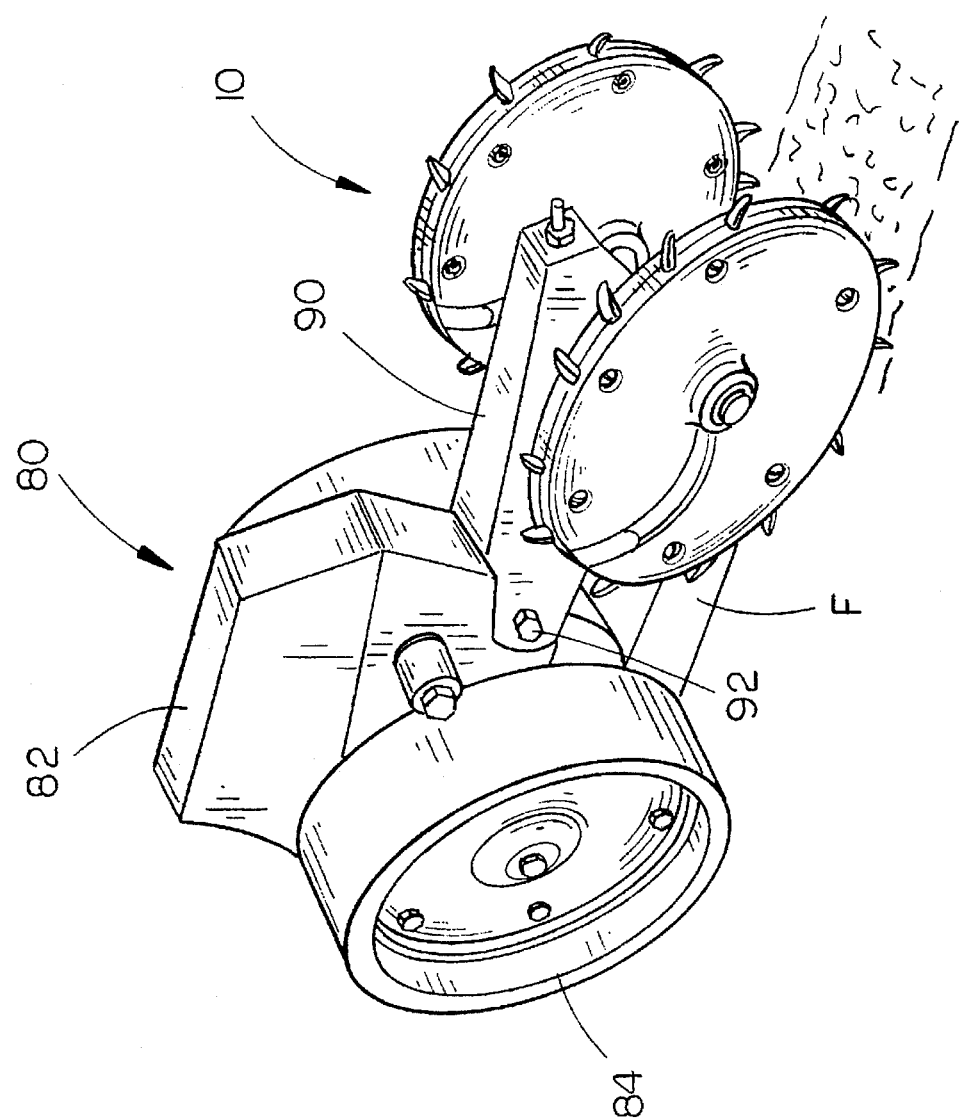
FIG. 5 is a perspective view of a seed planter incorporating the second configuration of the invention.
Figure 6:
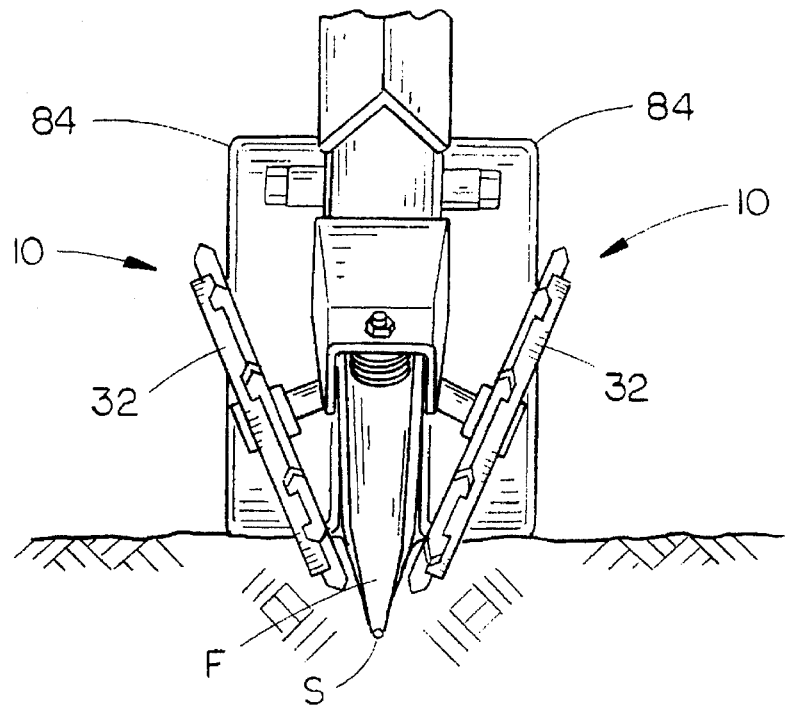
FIG. 6 is a rear elevational view of a seed planter incorporating a third configuration of the invention.

As shown in FIGS. 4, 5, and 6, a planter 80 has a main frame 82 which is supported by vertically adjustable gauge wheels 84. A pair of furrow forming discs 86 penetrate the soil as the planter 80 is drawn over the ground, and seed is periodically deposited at spaced intervals through a seed tube 88. A subframe 90 is pivotally attached to the main frame 82 by a pivot bolt 92 which allows for movement of the subframe 90 in a vertical plane. A tension spring 94 exerts an adjustable downward force on the subframe 90 to control the pressure applied by the furrow closing apparatus 10. A pair of downwardly canted axles 96 are mounted on the trailing end portion of the subframe 90 upon which rotate the various configurations of the furrow closing apparatus 10 of the present invention.

Figure 7:
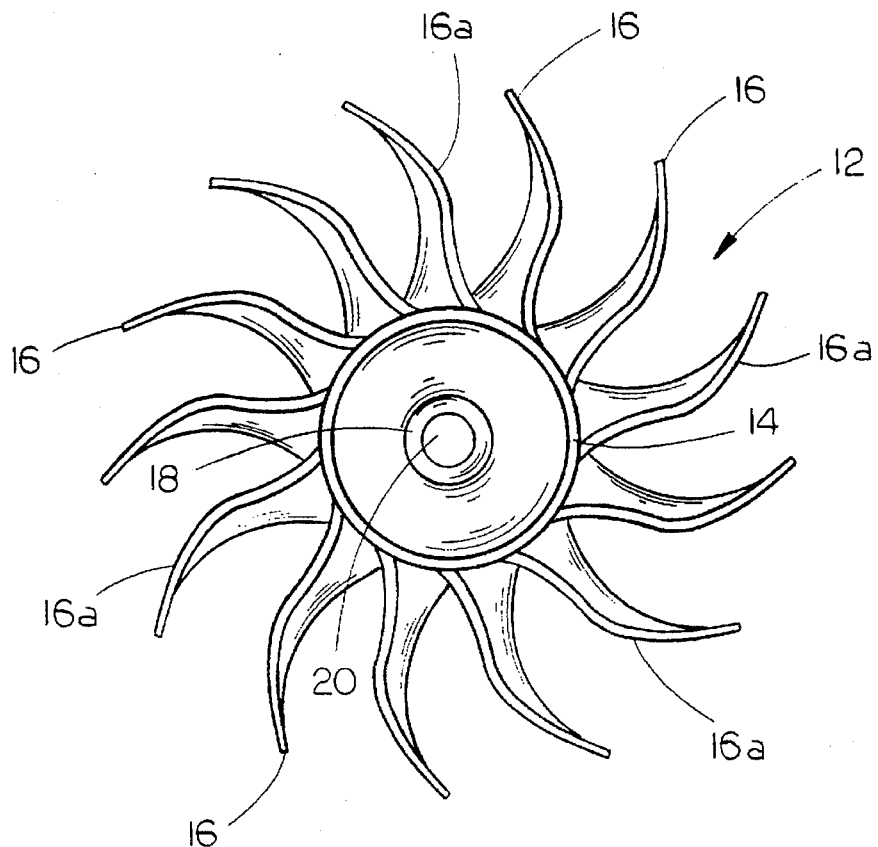
FIG. 7 is a side elevational view of the tine wheel of the invention.
Figure 8:
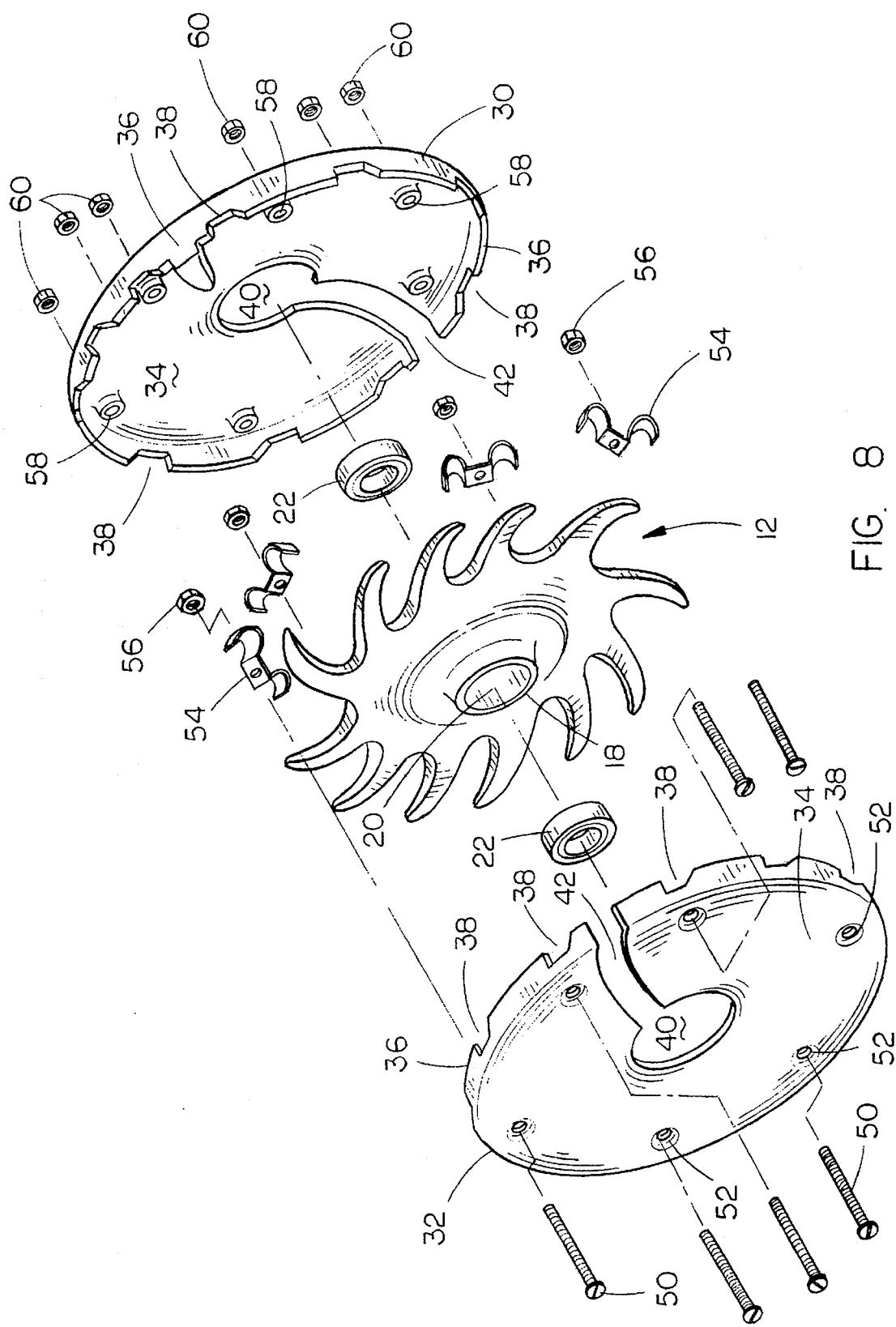
FIG. 8 is an exploded perspective view of the invention.

Referring now to FIGS. 7 and 8, the invention 10 is seen to comprise a tine wheel 12, an inner press plate 30, and an outer press plate 32. The tine wheel 12, preferably fabricated from iron or steel, includes a central hub 14 on which are rigidly mounted a plurality of spaced, radially projecting rigid tines 16. In the preferred embodiment, each tine is radially curved to provide a convex surface 16a which initially contacts the soil surface and leads the tine 16 through the soil, thus providing a compressing action on the soil. The hub 14 has a central bearing housing 18 with a cylindrical bore 20 into which are pressed bearings 22 for receipt of the subframe axles 96.

The inner press plate 30 and outer press plate 32 are mirror images of each other and comprise a flat steel plate 34 with a circumferential lip 36. The circumferential lip 36 has a plurality of notches 38 through which extend the tines 16 when the tine wheel 12 is sandwiched between the press plates 30, 32. The flat steel plates 34 each have a central aperture 40 through which extends the bearing housing 18 of the tine wheels 12. The steel plates 34 also have a radial slot 42 which allows the inner press plate 30 to be removed from the tine wheel 12 without first removing the invention 10 from the axle 96.

The invention 10 is designed such that the tine wheel 12 may be used alone, without either press plate 30, 32; the tine wheel 12 may be used with either the inner press plate 30 or outer press plate 32 alone; or the tine wheel 12 may be used with both press plates 30, 32 attached. As depicted in FIG. 8, the outer press plate 32 is first secured to the tine wheel 12 by means of six bolts 50 which extend through holes 52, between the tines 16, through double-U shaped tine clips 54, and finally into threaded nuts 56. The inner press plate 30 may then be attached by further extending the bolts 50 through holes 58 in the inner press plate 30 and securing them with threaded nuts 60. After the invention 10 is installed on the planter 80, if soil is encountered where use of the tine wheel 12 with only the outer press plate 32 is desirable, the inner press plate can be quickly removed by removing the nuts 60 and sliding the press plate 30 off of the axle 96 by means of the radial slot 42. The use of the invention 10 with only the outer press plates 32 is depicted in FIG. 6. There are of course situations when it may be desirable to use the invention 10 with only the inner press plate 30 installed, in which case it would be necessary to run the bolts 50 from inside-out rather than outside-in.

It should be obvious to one skilled in the art that many modifications and variations of the present invention are possible in light of the above teachings. For example, although curved tines are used in the preferred embodiment, straight tines could certainly be used as well. It is therefore to be understood that, within the scope of the appended claims, the invention may be practiced otherwise than as specifically described.

What is claimed is:

1. In a seed planter having a frame, a seed furrow opener depending from said frame and engagable with the soil to produce a seed furrow, means for dropping seeds into said seed furrow at spaced intervals, a subframe extending rearwardly from said frame and having a pair of laterally spaced axles with axes oppositely angularly disposed relative to a horizontal reference, a seed furrow closing apparatus, comprising:

(a) a tine wheel having a hub for operative engagement upon said axles and having a plurality of circumferentially spaced tines projecting radially from said hub; and (b) inner and outer press plates, each having a sidewall with a circumferential shoulder, said circumferential shoulder having a plurality of spaced slots through which extend said tines, said inner and outer press plates selectively securable to, and removable from, said tine wheel.

2. The seed furrow closing apparatus of claim 1 wherein said tines extend in an arcuate fashion from said hub and through said spaced slots of said press plates.

3. The seed furrow closing apparatus of claim 1 wherein at least said inner press plate has a central aperture with a radial slot extending therefrom through said circumferential shoulder whereby said inner press plate is attachable to, and removable from, said tine wheel without removing said tine wheel from said axle.

\* \* \* \* \*